United States Patent [19]

Grants et al.

[11] 4,251,883

[45] Feb. 17, 1981

[54] FAULT DETECTION APPARATUS FOR A PROGRAMMABLE CONTROLLER

[75] Inventors: Valdis Grants, Lyndhurst; Ronald E. Schultz, Willoughby, both of Ohio

[73] Assignee: Allen-Bradley Company, Milwaukee, Wis.

[21] Appl. No.: 30,616

[22] Filed: Apr. 16, 1979

[51] Int. Cl.³ .............................................. G06F 11/00
[52] U.S. Cl. ...................................... 371/29; 361/92; 364/900; 371/16; 371/66
[58] Field of Search .................... 364/900; 371/15, 16, 371/29, 66; 361/92

[56] References Cited

U.S. PATENT DOCUMENTS

| 3,997,879 | 12/1976 | Markley et al. | 364/900 |
| 4,063,311 | 12/1977 | Jeremiah et al. | 364/900 |
| 4,118,792 | 10/1978 | Struger et al. | 364/900 |
| 4,172,289 | 10/1979 | Struger et al. | 364/900 |
| 4,178,634 | 10/1979 | Bartlett | 364/900 |

Primary Examiner—Charles E. Atkinson
Attorney, Agent, or Firm—Quarles & Brady

[57] ABSTRACT

A battery monitoring circuit in a programmable controller generates a logic signal when it senses a low output voltage from a memory back-up battery. A controller processor is programmed to set a fault status bit and store it in a memory with input/output status data. The fault status bit is output to an I/O interface rack together with input/output status data during an I/O scan routine. The fault status bit generates a logic signal to a fault indicating device on the I/O interface rack to signal an under-energized memory battery in the controller processor.

10 Claims, 4 Drawing Figures

FAULT DETECTION APPARATUS FOR A PROGRAMMABLE CONTROLLER

BACKGROUND OF THE INVENTION

1. Field of the Invention

The field of the invention is programmable controllers, and more particularly, apparatus for monitoring various conditions within such controllers during their operation, and for indicating any malfunctions which may occur.

2. Description of the Prior Art

One common type of programmable controller includes a controller processor unit that is connected through communication cables to one or more I/O interface racks. The I/O interface racks are connected to corresponding sets of operating devices, which either directly connect to a machine or directly control an industrial process. The controller processor unit includes a memory and operates in response to a control program stored in the memory to examine the status of sensing devices and to energize and deenergize output devices according to the sensed conditions and the logic contained in the control program. Such sensing devices might include, for example, limit switches and photoelectric cells, while such output devices might include solenoids, relays and motor starters. Besides controlling these operating devices, the programmable controller also monitors conditions within its own components to detect malfunctions that may occur.

In programmable controllers, such as that disclosed in Struger et al, U.S. Pat. No. 4,118,792, issued Oct. 3, 1978, and entitled "Malfunction Detection System for a Microprocessor-Based Programmable Controller," there are two possible responses to malfunctions detected in the controller. One response is an interruption in communication between the controller processor and the I/O interface racks. The controller processor is held, and all operating devices connected to the interface racks are decontrolled. The other response is the activation of a fault status indicator on the component of the programmable controller in which the fault originated. In the programmable controller referred to above, light-emitting diodes (LEDs) are used for this purpose.

In the prior controller referred to above, major faults such as a communication fault between the controller processor and any of the I/O interface racks cause the interruption of communication and the illumination of a LED on the I/O interface rack where the fault originated. For major faults in the controller processor itself, a watchdog timer "times out," the operation of the programmable controller is suspended, and a LED on the controller processor unit is illuminated. For minor fault conditions, such as a weak memory back-up battery, the controller processor is not interrupted, but a LED on the controller processor is illuminated. In programmable controllers having read/write random-access memories (RAMs), a memory back-up battery is necessary for supplying power to the memory when a controller is not being operated, so that the contents of the memory will not be altered or lost.

With the introduction of programmable controllers having I/O interface racks distributed to locations that are remote from the controller processor unit (see, for example, Markley et al, U.S. Pat. No. 3,997,879, issued Dec. 14, 1976), a minor fault indication at the controller processor is not likely to be observed by machine operators at the I/O interface racks. In many industrial applications, programmable controllers are run nearly continuously and unattended, so that the controller processor unit is observed only at irregular intervals. The LEDs on the controller processor unit will only be observed during startup and shutdown, which may only occur when the controller processor is serviced. It would therefore be advantageous to have fault status indicators on the I/O interface racks, which indicate those controller processor faults that do not result in a complete suspension of operation, e.g., a LED indicating a weak memory back-up battery.

SUMMARY OF THE INVENTION

The invention provides for the generation of fault status bits and the storage of these bits in a main memory associated with a controller processor. These fault status bits are maintained in I/O image tables with bits indicating the status of operating devices being controlled through I/O interface racks. Under the direction of the controller processor, these fault status bits can be output to the I/O interface racks, to a program panel, to a supervisory computer, or to other units having fault-indicating capability.

A programmable controller which incorporates the invention has a controller processor, a memory that stores input/output status data, and an I/O interface rack, all of which are connected to one another through an I/O data bus.

The controller also includes sensing circuit means for generating a bit of data in response to a fault in the programmable controller. The controller processor is coupled to the sensing circuit means and is responsive to couple fault status bits from the sensing circuit means to the I/O image table. Fault indicating means are coupled to the memory through the I/O data bus, for receiving fault status bits that are output from the memory during an input/output routine.

Among the fault status bits that can be monitored and output are a bit indicating a memory parity error, and a bit indicating a weak memory back-up battery. I/O communication faults, which are major faults and which cause an interruption in operation of the programmable controller, are also monitored to provide identification of the major fault to other devices that are still communicating with the controller processor.

Where a bit is output from the I/O image table to an I/O interface rack to signal a fault, various types of warning devices, such as bells, buzzers or lights, can be connected to an output location on an I/O interface rack in place of an operating device that controls a machine or process. Although an I/O communication fault in the prior controller activates a LED on the I/O interface rack where the fault originated, and causes an interruption in communication between the controller processor and the I/O interface racks, the setting of a corresponding fault status bit in the I/O image table enhances the capability of the programmable controller to communicate with a supervisory computer.

One object of the invention is to maintain the status of programmable controller malfunctions in an I/O image table that also stores the status of operating devices through which a machine or process is controlled by the programmable controller.

Another object of the invention is to provide a visible or audible signal at an I/O interface rack to indicate a malfunction in the operation of the controller processor.

Anothe object of the invention is to receive, store and send fault status bits for a number of different malfunctions which may possibly occur in the operation of programmable controllers.

The foregoing and other objects and advantages of the invention will appear from the following description. In the description reference is made to the accompanying drawings which form a part hereof, and in which there is shown by way of illustration of a preferred embodiment of the invention. Such embodiment does not necessarily represent the full scope of the invention, however, and reference is made to the claims for determining the scope of the invention.

DESCRIPTION OF THE PREFERRED EMBODIMENT

Figure 1:
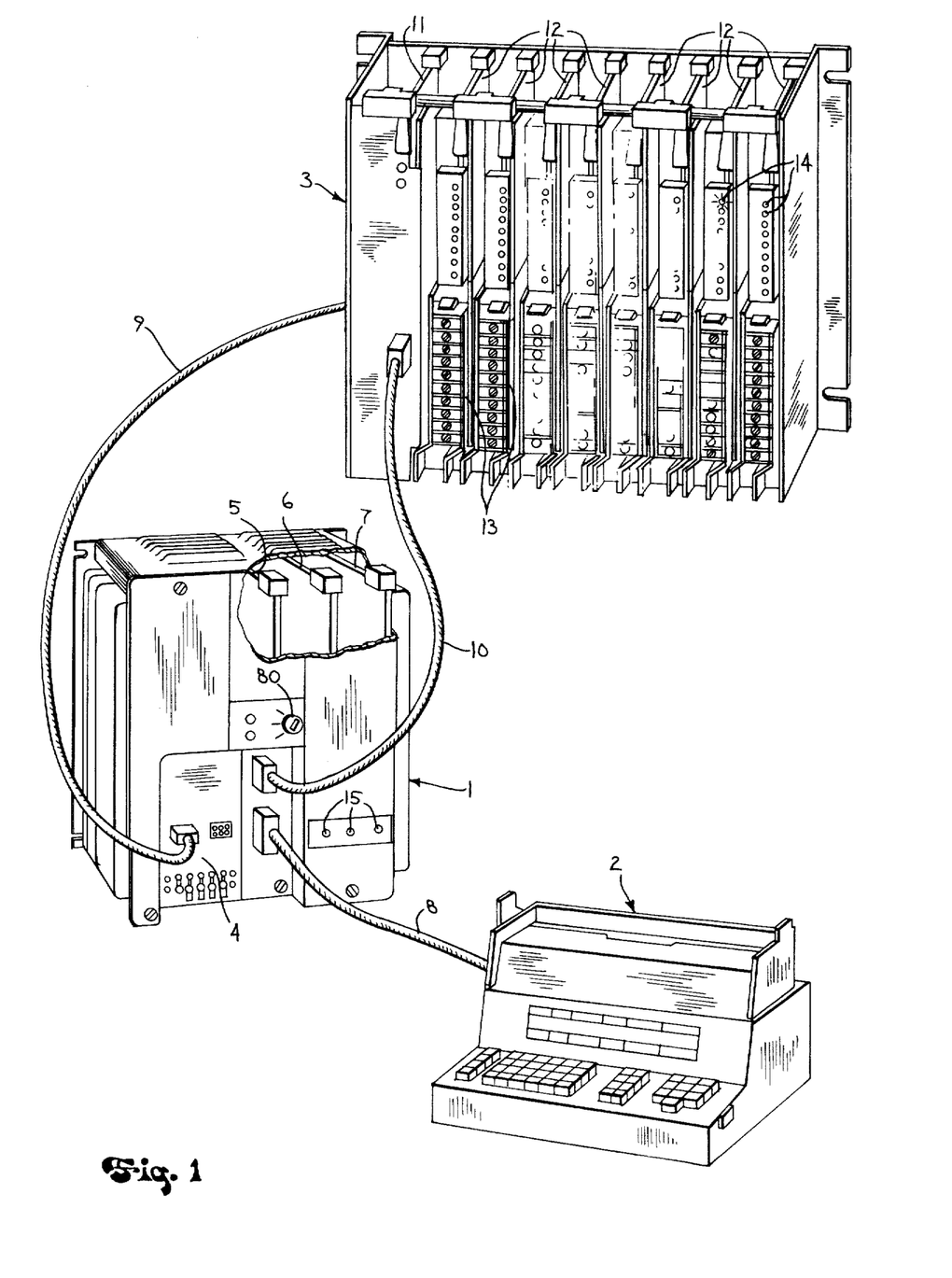
FIG. 1 is a perspective view of a programmable controller which employs the present invention with parts cut away to show the interior of the controller processor unit.

Referring to FIG. 1, the programmable controller that incorporates the present invention includes a central processor unit 1, a program panel 2, and an I/O interface rack 3. The central processor unit 1 houses, from left to right, a main power supply 4, a processor interface module 5, a controller processor module 6, and a memory module 7. The program panel 2 is connected to the central processor unit through a panel interconnect cable 8. The program panel 2 is used to enter, edit and display program instructions and other data stored on the memory module 7. The I/O interface rack 3 is connected to the power supply 4 through a power cable 9, and is also connected to the processor and memory modules 5-7 through an I/O interconnect cable 10.

The I/O interface rack 3 holds nine closely spaced circuit boards in upright position. The circuit board farthest to the left is a rack adapter module 11, while the other eight circuit boards are I/O modules 12 having either eight input circuits (i.e., an input module) or eight output circuits (i.e., an output module). The output circuits, such as those disclosed in U.S. Pat. No. 3,745,546, are each connected to drive operating devices on an associated controlled machine (not shown), while the input circuits, such as those disclosed in U.S. Pat. No. 3,643,115, are each connected to sensing devices on an associated controlled machine (not shown). Thus, the I/O interface rack 3 has a cpacity to monitor and control sixty-four separate operating devices on an associated controlled machine.

On the lower half of the front portion of the I/O interface rack 3 are a plurality of swing arm connectors 13, each connector 13 being connected to an associated I/O module 12. On the upper half of the front portion of the I/O interface rack 3 are sets of status indicators 14, which may be light-emitting diodes (LEDs) or other devices. These status indicators 14 are connected to fuses, for example, to indicate when the fuse is blown. For more details of the construction of the I/O interface rack 3, reference is made to Struger et al, U.S. Pat. No. 4,151,580 issued Apr. 24, 1979, and assigned to the assignee of the present invention. The controller processor unit 1 has its own status indicators 15 in the form of LEDs located on the front edge of the processor and memory modules 6 and 7. These status indicators 15 indicate faults in these modules 6 and 7 such as a parity error or a low memory battery.

Figure 2:
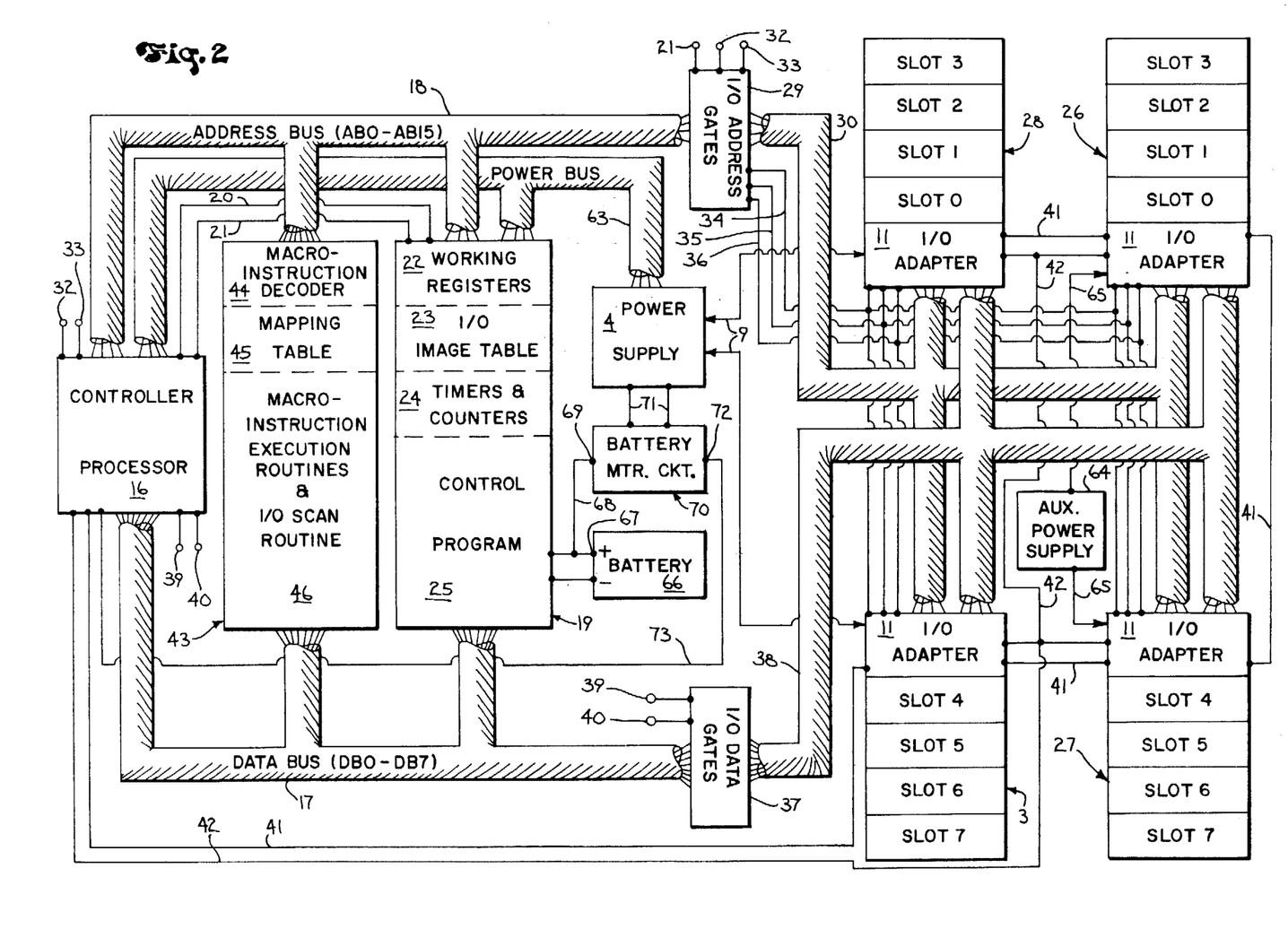
FIG. 2 is a block diagram of the programmable controller of FIG. 1.

Referring to FIG. 2, a controller processor 16 which includes the controller processor module 6 and the processor interface module 5 is connected to other parts of the controller through an eight-bit bidirectional data bus 17 and a sixteen-bit address bus 18. A random-access memory (RAM) 19 connects to both the data bus 17 and the address bus 18. An eight-bit data word may be written into an addressed line or read out of an addressed line of the RAM 19 in response to control signals applied to a "data out strobe" line 20 and a memory request control line 21. The RAM 19 includes from 512-8K lines of memory depending on the size of the control program to be stored. The first 256 lines in the memory 19 are divided into working registers 22, an I/O image table 23, and a timer and counter storage area 24. The remainder of the RAM 19 stores the control program 25 which is comprised of a large number of programmable controller-type instructions. These instructions are loaded into the memory 19 through the program panel 2 and the controller processor 16. For further information on the operation of the program panel 2, reference is made to Dummermuth et al, U.S. Pat. No. 4,165,534 issued Aug. 21, 1979, and assigned to the assignee of the present invention. Reference is also made to this copending application for further details of the construction and operation of the basic programmable controller, which are summarized herein.

As seen in FIG. 2, three I/O interface racks 26-28, as well as the I/O interface rack 3 seen in FIG. 1, are coupled to the address bus 17 and the data bus 18 through a set of I/O address gates 29 and a set of I/O data gates 37. Each of the I/O interface racks 3 and 26-28 is capable of controlling an associated machine or process. The I/O interface racks 3 and 26-28 each include a rack adapter module 11 and eight I/O modules 12, each having either an eight-bit input capacity or an eight-bit output capacity. For addressing purposes, two I/O modules 12 are assigned to each slot number "0-7," and two of the I/O interface racks constitute a rack group, either "rack group 1" or "rack group 2." Each rack slot therefore includes sixteen input circuits or sixteen output circuits, one I/O module corresponding to a low address byte and the other I/O module in the slot corresponding to a high address byte.

I/O addresses are generated on a portion of the main address bus 18 (AB0-AB4) by the controller processor 16. They are coupled to an I/O address bus 30 by the I/O address gates 29 which are enabled when a logic high voltage is generated on an "I/O SEL" control line 32. In addition to the I/O address, the I/O address gates 37 couple the memory request control line 21 and a write output control line 33 to each of the interface racks 3 and 26-28 through a read line 34 and a write line 35. A strobe line 36 also connects to each rack 3 and 26-28 to indicate when data is present on the I/O address bus 30.

Data is coupled to or from a particular card in one of the I/O interface racks 3 and 26-28 by addressing it through the five-bit I/O address bus 30. The rack adapter module 11 on each I/O interface rack 3 and 26-28 includes circuitry for sensing and decoding an address which appears on the I/O address bus 30. The highest of the five bits on the I/O address bus 30 determines the rack group, the next three determine the rack slot between "0" and "7" inclusive, and the lowest bit determines whether the high or low byte is addressed.

The user programs a five-digit octal address, such as "02700" to generate signals on the I/O address bus 30. The "0" in the highest octal digit identifies the I/O location as an output module and generates a signal on the write line 35. The "2" in the next highest digit identifies rack group "2" and the "7" in the middle digit identifies rack slot "7." This generates the appropriate signals on the first four lines of the address bus 30. The last two digits "00" in the user address identify the output terminal address and generate the low bit signal on the address bus 30. A fault status indicator 14, which is being actuated in FIG. 4 to emit a visible and audible signal, is connected to an output circuit at the user address "02700" in the I/O interface rack 3.

Data is coupled between the controller processor 16 and the I/O interface racks 3 and 26-28 through the I/O data gates 37 and an eight-bit I/O data bus 38. When a logic high voltage is generated on the read line 34, eight bits of data appear on the I/O data bus 38 and are coupled to the main data bus 18 through the I/O data gates 37. Conversely, when a logic high is generated on the write control line 31, an eight-bit output data word is coupled from the controller processor 16, through I/O data gates 37, to an addressed output module in one of the I/O interface racks 3 and 26-28. The I/O data gates 37 are controlled by a bus enable control line 38 which is driven to a logic high voltage when output data is sent to the I/O interface racks 3 and 26-28, and by a receiver latch enable control line 40 which is driven to a logic high voltage when input data is to be received from an addressed I/O module.

The control program stored in the RAM 19 is repeatedly executed, or scanned, by the controller processor 16 when it is in the "RUN" mode. Each execution cycle of the control program 25 typically requires twenty milliseconds, although the eact time depends on the length of the control program 25 and the types of instructions included. After each such execution cycle, an I/O scan routine is executed to couple data between the I/O interface racks 3 and 26-28, and the I/O image table 23 in the RAM 19. The I/O image table stores either an input status byte or an outpt status byte for each I/O module in the interface racks 3 and 26-28. Each line of data in the I/O image table 23 is thus associated with a specific module in one of the I/O interface racks 3 and 26-28. An input status byte is an image of the state of eight sensing devices on a particular input module and an output status byte is an image of the desired state of eight operating devices connected to an output module.

The I/O scan routine is a programmed sequence in which output status bytes are sequentially coupled from the I/O image table 23 to their associated I/O output modules 12 and input status bytes are sequentially coupled from I/O input modules 12 to their associated memory locations in the I/O image table 23. The controller processor 16 operates on data in the I/O image table 23 rather than data received directly from the I/O interface racks 3 and 26-28. This allows the processors to operate at maximum speed to execute the control program 25 in a minimum amount of time.

Besides the control lines and buses which couple the I/O interface racks 3 and 26-28 and the controller processor 16, two other lines interconnect these elements. An I/O fault line 41 is connected in "daisy-chain" fashion to the four I/O interface racks 3 and 26-28. The fault line 41 has one end connected to a signal ground and the other end connected to the controller processor 16. An I/O reset line 42 is connected at one end to a controller processor 16 and has parallel connections at the other end to all four of the I/O interface racks 3 and 26-28. If a fault condition occurs in any of the I/O interface racks 3 and 26-28, the I/O fault line 41 rises to a logic high voltage. The controller processor 16 responds by generating a logic low voltage upon the I/O reset line 42. The I/O reset line 42 connects to the output circuits in the I/O interface racks 3 and 26-28, and when it goes low, these output circuits are "decontrolled," i.e., decoupled from the controller processor 16.

Still referring to FIG. 2, the controller processor 16 is also connected through the data bus 17 and the address bus 18 to a read-only memory (ROM) 43 which stores up to 2048 machine instructions. The controller processor 16 repeatedly executes a macro-instruction decoder routine 44 stored in the ROM 43 to fetch and execute control program instructions stored in the RAM 19. Macro-instructions of the type customarily used in programmable controllers, such as XIC, XIO, OTE, OTD, OTL and OTU, are decoded and executed with the assistance of special hardware in the controller processor 16. A mapping table 45 in the ROM 43 is employed for other controller-type instructions and for general instructions which perform the I/O scan and other routines. The mapping table 45 contains starting addresses for associated macro-instruction execution routines 46 stored at higher addresses in the ROM 43. When required by the type of instruction fetched from the RAM 19, the macro-instruction decoder routine 44 addresses a line in the mapping table 45 that has a jump instruction to the starting address of the appropriate macro-instruction execution routine.

Figure 3:
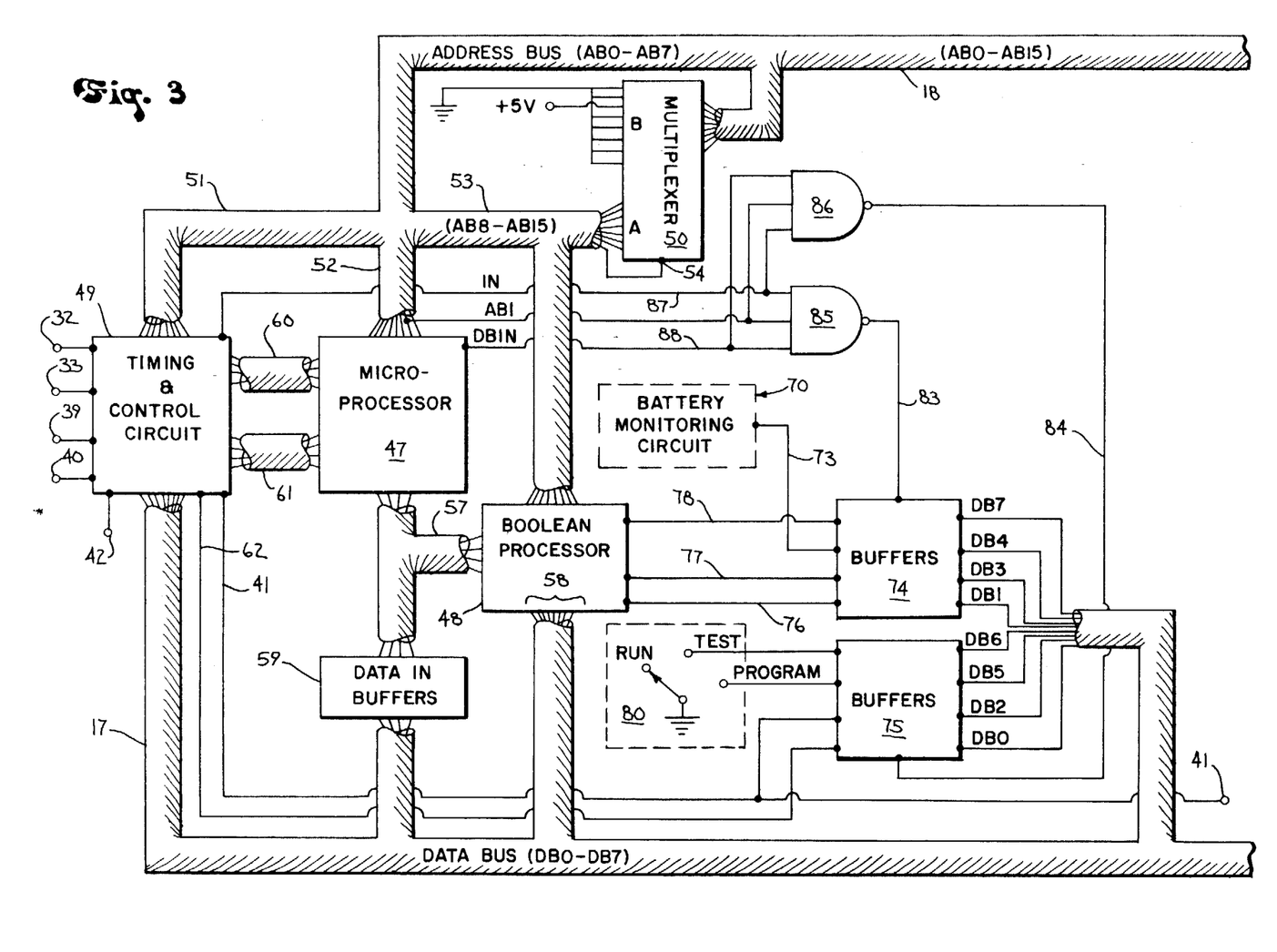
FIG. 3 is a block diagram of the controller processor and the battery monitoring circuit which forms part of the programmable controller of FIG. 1.

As seen in FIG. 3, the controller processor 16 includes a microprocessor 47, a hardwired Boolean processor 48, and a timing and control circuit 49. The microprocessor 47 is an eight-bit, 72-instruction, LSI chip manufactured by the Intel Corporation and sold as the Model 8080. For details of the internal structure, the operation and the instruction set for this microprocessor 47, reference is made to the publication "Intel 8080 Microcomputer System Users Manual," dated September, 1975.

The main address bus 18 is divided into a number of brancehs which connect to various components of the controller processor 16 and to a multiplexer 50. One branch 51 that includes leads AB1, AB2, AB13, AB14, and AB15 connects to the timing and control circuit 49. Another branch 52 that includes leads AB0-AB15 connects directly to the microprocessor 47, and a third branch 53 that includes leads AB8-AB15 connects to the A inputs on the multiplexer 50 and to the inputs on the Boolean processor 48. The lead AB15 in the third branch 53 connects to a select terminal 54 on the multiplexer 50, and depending on its logic state, the leads AB8-AB15 in the address bus 18 are coupled to either the third branch 53 or to a constant that is applied at the B inputs of the multiplexer 50.

Referring to both FIGS. 2 and 3, the ROM 43 stores up to 2048 machine instructions at addresses from 0 to $2047_{10}$, for a total of 2K lines of memory. Data is stored in the RAM 19 on lines with addresses of $2048_{10}$ and higher. When the select terminal 54 on the multiplexer 50 is in one logic state, leads AB8–AB15 in the third address bus 53 are connected to corresponding leads in the main address bus 18, and the address on the full sixteen bits AB0–AB15 selects a line in the ROM 43. When the select terminal 54 on the multiplexer 50 is in its other logic state, the constant is applied to leads AB8–AB15 in the address bus 18, and the address on the lowest eight bits AB0–AB7 provided by the microprocessor 47 addresses one of the first 256 lines in the RAM 19. These lines store the working registers 22, the I/O image table 23 and the timers and counters 24, which are associated with the execution of programmable controller instructions. As a consequence, when data is written into or read from the first 256 lines of the RAM 19, the leads AB8–AB14 in the third branch 53 are free to convey control information to the Boolean processor 48. The Boolean processor 48 responds to this control information to manipulate single bits of data that are selected from bytes of data received from the microprocessor 47 through a microprocessor data bus 57.

The main data bus 17 is connected to output terminals 58 on the Boolean processor 48 and is also connected through a set of DATA IN buffers 59 to the microprocessor data bus 57. Incoming data is recieved by the microprocessor 47 through the data buffers 59 and data is output by the microprocessor 47 to the main data bus 17 through the Boolean processor 48.

The timing and control circuit 49 is connected to the microprocessor 47 through a control input bus 60 and a control output bus 61, in addition to being coupled through the first branch 51 of the address bus 18 and through the data bus 17. The incoming I/O fault line 41, the outgoing I/O reset line 42, and an outgoing time base line 62 are also conencted to the timing and control circuit 49.

The microprocessor 47 controls the various elements of the controller processor 16 in response to instructions from the ROM 43, which are sequentially fetched and executed. During the execution of each machine instruction a status word appears on the data bus 18 to identify the nature of the microprocessor machine cycle in progress. This status word is saved in latches (not shown) in the timing and control circuit 49 and is used to develop control signals which assist the microprocessor 47 in directing the operation of the programmable controller.

Referring again to FIG. 2, the main power supply 4 is connected through a power bus 63 to the RAM 19, and to the controller processor 16 to provide the necessary d-c voltage signals to these parts of the controller. The power supply 4 is also connected through power cables 9 to a pair of I/O interface racks 3 and 28. An auxiliary power supply 64 is connected through two other power cables 65 to the other pair of I/O interface racks 26 and 27.

A memory back-up battery 66 connects to the RAM 19 to supply d-c power to the RAM 19 when the controller is shut down and the main power supply 4 is shut off. The memory back-up battery 66 also provides reserve power when the connection between the power supply 4 and the RAM 19 is interrupted for other reasons. For example, the memory back-up battery 66 can be located on the memory module 7 to permit removal of the memory module 7 from the controller processor unit 1 without altering the contents of the memory. The memory back-up battery 66 can also be located in the main power supply 4 if space is not available on the memory module 7.

A positive terminal 67 on the memory back-up battery 66 connects through a voltage sensing line 68 to a voltage sensing terminal 69 on a battery monitoring circuit 70. The battery monitoring circuit 70 is connected to the main power supply 4 through two power lines 71. The battery monitoring circuit 70 has an output terminal 72 connected through a battery sensing line 73 to the controller processor 16. The memory battery monitoring circuit 70, like the memory battery 66 itself, can be located either on the memory module 7 or in the main power supply 4, wherever space permits, providing that electrical connections are made as indicated.

As seen more particularly in FIG. 3, the controller processor 16 includes sets of buffers 74 and 75 which couple status lines, including the battery sensing line 73 and the I/O fault line 41, to the data bus 17. The battery sensing line 73 is connected through the first set of buffers 74 to the fourth bit line DB4 in the data bus 17. Three other status lines 76–78 connect the Boolean processor 48 to bit positions DB1, DB3 and DB7 in the data bus 17 to sense the "RUN mode" or "power on" condition, the status of the branch decision flip-flop (not shown), and the status of the main decision flip-flop (not shown), respectively. The time base status line 62 coming from the timing and control circuit 49 is coupled through the second set of buffers 75 to bit position DB0 in the data bus 17. The I/O fault line 41 is coupled through the second set of buffers 75 to bit position DB2 in the data bus 17. A key switch 80, which is located on the controller processor unit 1 in FIG. 1, is in its "RUN mode" position. As seen in FIG. 3, this key switch 80 also has a PROGRAM terminal and a TEST terminal which are connected through the second set of buffers 75 to bit positions DB5 and DB6, respectively, to sense which of the three positions the switch 80 is in.

The sets of buffers 74 and 75 are enabled through two enable lines 83 and 84 that are connected to the outputs of a pair of corresponding NAND gates 85 and 86. The NAND gates 85 and 86 each have three inputs, one being connected to an IN control line 87 coming from the timing and control circuit 49, another being connected to a DBIN control line 88 coming from the microprocessor 47, and the other being connected to lead AB1 in the second branch 52 of the address bus 18. When logic high voltage signals are coupled to the NAND gates 85 and 86 through all three of these control lines, the two sets of buffers 74 and 75 are enabled and an eight-bit status word is read by the microprocessor 47 through the data bus 17 and the data IN buffers 59.

Figure 4:
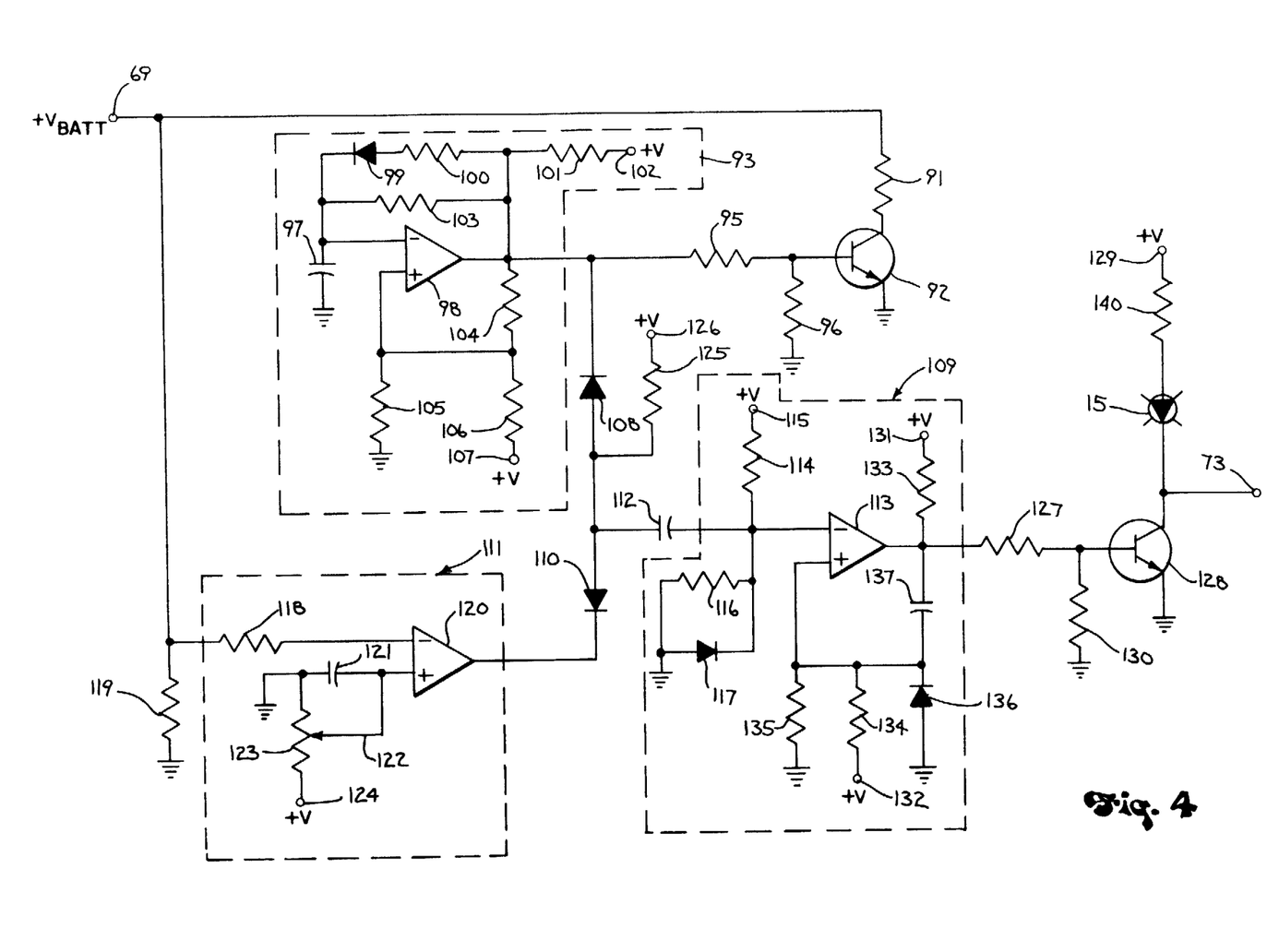
FIG. 4 is an electrical schematic diagram of the battery monitoring circuit of FIG. 3.

As seen in FIG. 4, the battery monitoring circuit 70 has an input 69, which is connected to the positive terminal 67 on the battery 66, and which is also connected through a load resistor 91 to the collector of an NPN transistor 92 that has its emitter connected to ground. The NPN transistor 92 is driven by an oscillator circuit 93 shown within the dotted lines and having an output connected through a series resistor 95 to the base of the NPN transistor 92. A biasing resistor 96 is connected between the base of the NPN transistor 92 and ground to bias the base-emitter junction.

When the oscillator provides a positive output voltage, current flows through resistors 95 and 96 which causes the NPN transistor 92 to "turn on" and draw current through the load resistor 91. The voltage at the positive output terminal 67 of the battery 66 is sensed while the battery is driving a full load because a weak battery may provide a near normal voltage under a no-load condition, but cannot provide such a voltage while driving its rated load.

The oscillator circuit 93 more particularly includes a capacitor 97, which is connected between an inverting input on an operational amplifier 98 and ground. The inverting input of the operational amplifier 98 is also connected to the cathode of a diode 99 having its anode connected through two resistors 100 and 101 to a positive d-c voltage source 102. Another resistor 103 is connected across the diode 99 and the resistor 100 and between the inverting input and the output of the operational amplifier 98. The output of the operational amplifier 98 is also connected through a resistor 104 to the noninverting input of the operational amplifier 98 and from there, through another resistor 105 to ground. The output of the operational amplifier 98 is also connected through the resistor 104 and another resistor 106 to positive d-c voltage source 107.

The oscillator circuit 93 provides a fast-charging current path for the capacitor 97 through the resistors 100 and 101 and the diode 99. When the capacitor 97 is charged, a relatively low output signal is generated at the output of the operational amplifier 98 and the NPN transistor 92 is shut off. The capacitor 97 discharges slowly through resistors 103–105, and when sufficiently discharged causes an increase in the output signal of the operational amplifier 98 to a relative higher level. Current is established through resistors 95 and 96 and the NPN transistor 92 is "turned on" to draw a rated full-load current from the battery 66. Due to the fast charging path and slow discharging path connected to the capacitor 97, the NPN transistor 92 is "off" for longer periods than it is "on."

The oscillator circuit 93 is also connected through a diode 108 to a one-shot multivibrator circuit 109 and through an additional diode 110 to a comparator circuit 111 for disabling the multivibrator circuit 109. The one-shot multivibrator circuit 109 is coupled through a capacitor 112 to the anodes of both diodes 108 and 110. The negative plate of the capacitor 112 is also connected to an inverting input of an operational amplifier 113. This inverting input is also connected through a resistor 114 to a positive d-c voltage source 115, and is also connected through another resistor 116 to ground. A diode 117 is connected in parallel with the second resistor 116, and has its cathode connected to the negative plate of the coupling capacitor 112. The diode 117 protects the capacitor 112 by clamping the voltage at its negative plate and preventing it from becoming too negative.

The resistors 114 and 116 divide the voltage from the d-c source 115 and cause the bias voltage at the inverting input of the operational amplifier 113 to be slightly more positive than the voltage at its noninverting input. Under this condition the output voltage of the operational amplifier 113 is held low. To generate an output pulse from the one-shot multivibrator circuit 109 the voltage at the inverting input must be lowered. This is accomplished when the disabling circuit 111 responds to a low voltage from the battery 66.

The input 69 of the battery monitoring circuit 70 is connected to the disabling circuit 111 through a coupling resistor 118 and is connected to ground through another resistor 119. The coupling resistor 118 is connected to the inverting input of an operational amplifier 120. The noninverting input of this amplifier 120 is connected to the negative plate of a capacitor 121 having its positive plate connected to ground. The noninverting input of the amplifier 120 is also connected through a wiper 122 that moves along a resistive element 123. This resistive element 123 is connected between the grounded plate of the capacitor 121 and a positive d-c voltage source 124. Through the wiper 122 the resistance is adjusted to provide a reference voltage at the noninverting input of the operational amplifier 120 that is slightly less than the voltage at the inverting input when the battery is supplying its normal fullload output voltage. The output voltage of the operational amplifier 120 is therefore low, which holds the junction between the diodes 108 and 110 low, irrespective of the output of the oscillator circuit 93. This is the disabling function. When the battery voltage drops below the reference, the output voltage of the operational amplifier 120 goes high, and the voltage input to the one-shot multivibrator is controlled by the output of the oscillator 93.

When the oscillator circuit 93 is "off," the voltage of the anode of the diode 108 is held low, even through it is connected through a resistor 125 to a d-c voltage source 126. When the oscillator circuit 93 generates a pulse, and the battery voltage is low, a pulse is generated at the input of the operational amplifier 113 in the one-shot multivibrator circuit 109. The falling edge of this pulse generates an output pulse from the operational amplifier 113, and this output pulse is coupled through a resistor 127 to the base of an NPN transistor 128.

The NPN transistor 128 is connected through its collector to control current through a LED 15 on the central processor unit 1. The cathode of the LED 15 is connected to the collector of the NPN transistor 128 and the anode of the LED 15 is connected through a pull-up resistor 140 to a d-c voltage source 129. The emitter of the NPN transistor 128 is grounded, and the base of the NPN transistor 128 is also connected through a biasing resistor 130 to ground. The collector is also connected to the battery sensing line 73. When an output pulse is generated by the one-shot multivibrator circuit 109, the transistor 128 will conduct, the LED 15 will be illuminated, and the collector will be pulled low and sensed through the battery sensing line 73.

The one-shot multivibrator circuit 109 also includes a biasing and feedback network connected between its output and its noninverting input. The network includes two d-c voltage sources 131 and 132, three resistors 133–135, a diode 136 and a capacitor 137. This network controls the duty cycle of the one-shot multivibrator circuit 109 to generate a pulse width greater than the width of the output pulses from the oscillator circuit 93. The oscillator pulses would be too short in duration to illuminate the LED 15 in a readily observable manner.

Referring again to FIGS. 2 and 3, when the LED 15 is illuminated, a logic low voltage signal is present on the battery sensing line 73. During a fault status check, the two sets of buffers 74 and 75 are enabled, and the status of the battery sensing line 73 is read by the microprocessor 47 along with the status of seven other hardware circuits. The fault status check is made after the end of the I/O scan routine and before the next execution cycle of the control program where status bits in the input image table are examined and status bits in the output image table are set.

During the I/O scan routine the I/O slots in the I/O interface racks 3 and 26–28 are sequentially addressed. A byte of output status data is coupled from the output image table to each slot, and a byte of input status data is coupled from each slot to the input image table. The I/O scan routine is executed by the miroprocessor 47, without the aid of the Boolean processor 48, because the instructions in the I/O scan routine are word- or byte-oriented. The instructions in the I/O scan routine are disclosed in U.S. Pat. No. 4,165,534, cited above. The microprocessor 47 is assisted by the Boolean processor 48 in executing the routines in the control program 25 that perform operations such as examining and setting single bits of data. Control program routines are also disclosed in the allowed patent application Ser. No. 911,520, cited above.

In the present invention a battery check routine, comprising a sequence of instructions, is stored in the ROM 43 and is executed by the microprocessor 47 immediately after the I/O scan routine. The sequence of instructions for examining the memory battery voltage and setting a bit in the output image table when the battery is providing insufficient full-load voltage is given in Table 1 below.

TABLE 1

| Instruction | Comment |
|---|---|
| LXI H,RAM + 5C(H) | Load index register HL with address of fault status indicator. |
| MOV A,M | Reset status bit to zero at address 02700 |
| ANI FE(H) | in I/O image table. |
| MOV M,A | |
| IN STATS | Read status of hardware through buffers and data bus. |
| ANI 10(H) | Mask bit 4 in accumulator. |
| JNZ CONT | Battery is good if bit 4 equals 0, jump to first instruction in control program. |
| MOV A,M | Battery low, set bit at I/O image table |
| ORI 01(H) | location 02700 to "1" to activate fault |
| MOV M,A | status indicator during I/O scan. |
| CONT: | Beginning of the control program. |

Note:
(H) refers to a hexadecimal number.

As the comments in Table 1 illustrate, a bit representing the status of the battery sensing line 73 is tested, and a bit is stored in the I/O image table 23 according to the result of this test. As seen in FIG. 1, a status indicator 14 is physically connected to an I/O interface rack 3 in a location that is addressed when the contents of the I/O image table 23 are coupled to that location. By dedicating a specific output address to a specific fault, the type of fault can also be detected on the program panel by displaying the address of the fault status bit.

It should be apparent to those skilled in the art that similar instruction sequences can be programmed to examine the seven other hardware status bits in the status word. For example, the status of the I/O fault line 41 can be read and the bit can be set in the I/O image table 23, so that when data is coupled to other communicating devices, such as the program panel 2, a supervisory computer, or a central maintenance monitoring station, it will provide an indication of an I/O communication fault in the programmable controller. By storing controller self-test data in a memory, and providing for output of this data to a control interface such as the I/O interface racks 3 and 26–28, the fault monitoring capability of the programmable controller is considerably expanded and improved.

We claim:

1. An improved programmable controller of the type having a controller processor, a memory with a terminal to be monitored and an I/O interface rack connected to one another through an I/O data bus, the controller processor being operable to couple input-/output data between an I/O image table in the memory and the I/O interface rack through execution of an I/O routine, wherein the improvement comprises:

sensing circuit means electrically connected to the memory terminal for generating a bit of data to the controller processor in response to a fault at the memory terminal;

fault indicating means coupled to the memory through the I/O data bus, for receiving fault status bits that are output from the I/O image table during the I/O routine;

wherein the controller processor is connected to the sensing circuit means and is operable to couple fault status bits from the sensing circuit means to the I/O image table; and wherein the controller processor couples fault status bits to the fault indicating means through execution of the I/O routine.

2. In the programmable controller of claim 1, wherein the terminal on the memory is a power supply input adapted for connection to a memory back-up battery,, the further improvement circuit means includes a circuit with an input electrically connected to the power supply input on the memory and with an output connected to the controller processor, this circuit being operable to detect an undervoltage condition in the back-up battery.

3. The improvement recited in claim 1, wherein the fault indicating means is mounted on the I/O interface rack.

4. The improvement recited in claim 1, wherein the fault indicating means includes a device which emits a visible fault signal in response to receiving a fault status bit signal.

5. The improvement recited in claim 1, wherein the fault indicating means includes a device which emits an audible fault signal in response to receiving a fault status bit signal.

6. The improvement recited in claim 1, further comprising program panel means coupled to the controller processor means for displaying the I/O address of the fault status bit.

7. A programmable controller for sensing a weak memory back-up battery, which is adapted to be connected to a power supply input on a memory means, and which is used to power a portion of the memory means when the controller is disconnected from its primary power source, the controller comprising:

an I/O interface rack adapted to be connected to input devices and output devices on a machine;

the memory means, for storing an I/O image table of data that corresponds to the status of the input devices and output devices on the machine, and for storing two groups of processor instructions;

a controller processor coupled to the memory means and coupled to the I/O interface rack, the controller processor being operable to read and execute the first group of processor instructions in the memory means to periodically couple data between the memory means and the I/O interface rack during an I/O scan;

sensing circuit means, with an input connected to the power supply input on the memory means and with an output coupled to the controller processor, for generating fault status bits to the controller processor in response to an insufficient signal at the power supply input; and fault indicating means disposed on the I/O interface rack and coupled to both the controller processor and the memory means, for receiving fault status bits;

wherein the controller processor is responsive to read and execute the second group of processor instructions in the memory means to couple fault status bits from the sensing circuit means to the I/O image table in the memory means, and is responsive to the first group of processor instructions to output these fault status bits to the fault status indicating means during the next I/O scan.

8. The programmable controller of claim 7, wherein the fault indicating means includes a device which emits a visible fault signal in response to the receiving a fault status bit signal.

9. The programmable controller of claim 7, wherein the fault indicating means includes a device which emits an audible fault signal in response to receiving a fault status bit signal.

10. The programmable controller of claim 7, wherein the sensing circuit means is responsive to both an under-voltage fault in the memory back-up battery and an I/O communication fault and generates a respective fault status bit for each fault.

* * * * *

UNITED STATES PATENT AND TRADEMARK OFFICE
CERTIFICATE OF CORRECTION

PATENT NO. : 4,251,883

DATED : February 17, 1981

INVENTOR(S) : Valdis Grants and Ronald E. Schultz

It is certified that error appears in the above—identified patent and that said Letters Patent is hereby corrected as shown below:

Column 3, Line 3 - "Anothe" should be --Another--

Column 3, Line 11 - after the word "illustration" delete --of--

Column 3, Line 59 - "cpacity" should be --capacity--

Column 5, Line 6 - after the word "three" insert the word --bits--

Column 5, Line 34 - "38" should be --39--

Column 5, Line 45 - "eact" should be --exact--

Column 6, Line 55 - "brancehs" should be --branches--

Column 10, Line 17 - "fullload" should be --full-load--

Column 11, Lines 19 and 20 - "the allowed patent application Ser. No. 911,520" should be --U.S. Pat. No. 4,164,534--

Column 12, Line 30 - "battery,," should be --battery,--

UNITED STATES PATENT AND TRADEMARK OFFICE
CERTIFICATE OF CORRECTION

PATENT NO. : 4,251,883

DATED : February 17, 1981

INVENTOR(S) : Valdis Grants and Ronald E. Schultz

It is certified that error appears in the above—identified patent and that said Letters Patent is hereby corrected as shown below:

olumn 12, Line 31 - after the word "improvement" the phrase --wherein the sensing-- should be inserted Signed and Sealed this Twelfth Day of May 1981

[SEAL]

Attest:

RENE D. TEGTMEYER

Attesting Officer     Acting Commissioner of Patents and Trademarks